G. F. PATTERSON.
Stock-Car.
No. 225,486. Patented Mar. 16, 1880.
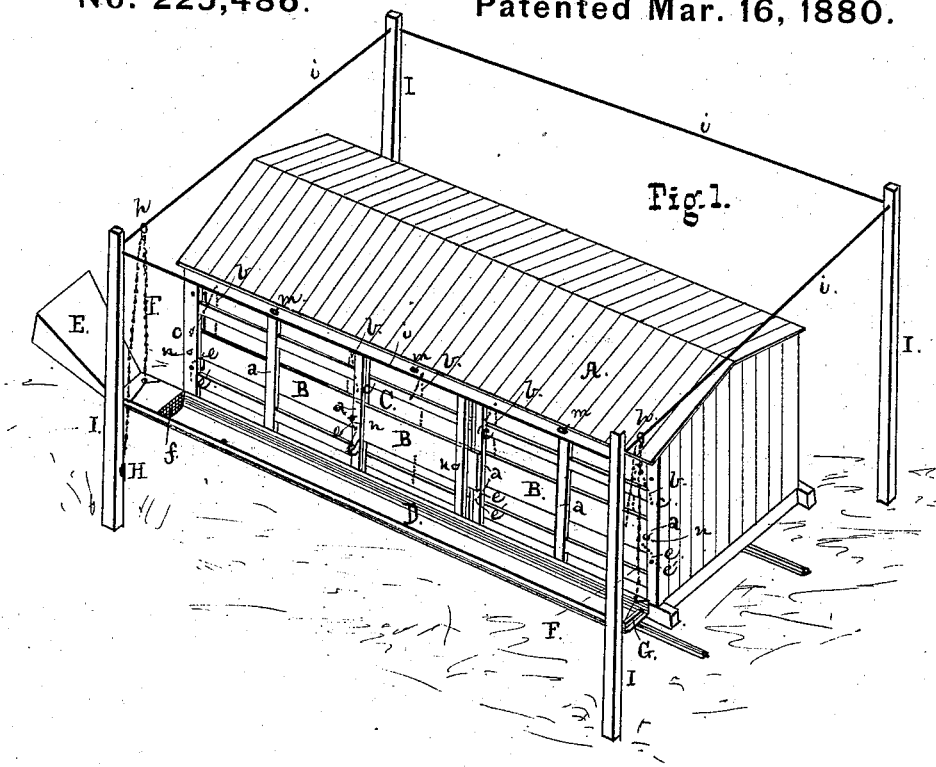
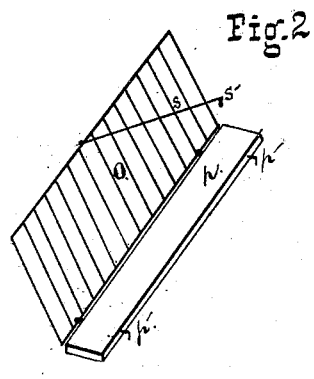
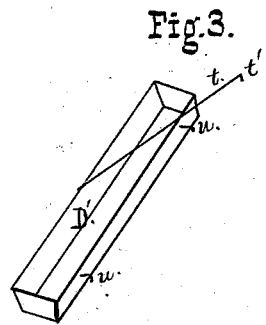
Witnesses,
W. A. Bertram
D. L. H. Barclay
Inventor,
GEO. F. PATTERSON
by H. D. Williams.
Attorney.

UNITED STATES PATENT OFFICE.

GEORGE F. PATTERSON, OF BALTIMORE, MARYLAND.

STOCK-CAR.

SPECIFICATION forming part of Letters Patent No. 225,486, dated March 16, 1880.

Application filed January 14, 1880.

*To all whom it may concern:*

Be it known that I, GEORGE F. PATTERSON, of Baltimore city, State of Maryland, have invented certain new and useful Improvements in Railway-Cars for Transporting Live Stock; and I hereby declare the same to be fully, clearly, and exactly described as follows, reference being had to the accompanying drawings, in which—

Figure 1 is a perspective view of a car embodying my improvements in connection with the apparatus for supplying the stock with water. Fig. 2 is a similar view of a removable hay-rack, and Fig. 3 a similar view of a water-trough adapted for attachment to the car.

The object of my invention is to furnish a stock-car of such construction as to admit of the feeding and watering of the animals without materially delaying the trains, and thereby place it within the power of railway companies to at least, in some measure, alleviate the sufferings of the animals incident upon the present mode of transportation.

Various devices for watering the stock have been proposed, consisting, generally, of troughs for containing the water normally suspended from the roof of the car and adapted to be lowered when desired. But the fact that the stock is suffering for want of water or food is apt to occur to the attendant so rarely that when it does happen, and he proceeds to supply their wants, they are liable to make such desperate efforts to reach the trough as to injure each other very seriously by trampling or goring. To obviate this I have devised means for supplying food or water at the side of the car and from the outside, (if necessary or desirable, from both sides simultaneously,) whereby all crowding or pressing to reach the trough is avoided, as a part of the same is presented to the muzzle of each beast in the position which he naturally occupies in the car—to wit, facing the sides of the car.

In the accompanying drawings, A is a slatted stock-car, similar, except in certain respects hereinafter pointed out, to those in ordinary use, being provided with the usual sliding door C, vertical stanchions *a a a a*, and horizontal slats, as shown. One of the horizontal slats is removed at a point opposite the muzzles of the animals, or two or three are removed in case the car is a two or three decker for transporting hogs or sheep. Opposite the opening thus made is a vertically-sliding slat, B, suspended by chains *b*, that are secured to pins *c*. Chains *e* on the lower side of these slats are adapted to be secured to pins *e'*, so as to hold the slats down and prevent the animals from lifting them.

At the various water stations or tanks are arranged posts I, connected by braces *i i*, and a trough, D, is arranged to be hoisted by chains F to a point opposite the opening in the car. These chains pass through pulleys *h*, that slide on the rods *i i*, and are secured to suitable cleats H on the posts I. The trough D is provided with an upwardly-inclined funnel E, and a wire-gauze sieve, *f*, at the upper end of the trough serves to prevent the entrance into the trough of sticks, leaves, or other trash. At the bottom of the trough is a ledge, G, serving as a dam to maintain a convenient depth of water in the trough. Second and third, &c., troughs are connected to the first, and so on through the length of the train.

In operation, when the engine is stopped at a water-tank, the hose is led into the funnel E and the various troughs are filled. The slats B being then lifted by means of the chains *b*, and the pulleys *h* being slid along the rods *i*, so as to bring the trough against the side of the car, the animals drink their fill.

Now, inasmuch as it sometimes happens that a collision occurs or the engine breaks down at points where it is impossible to procure water for the stock, and with the ordinary stock-cars it would be impracticable to water the stock, even if water could be procured, I have devised means for meeting this emergency.

It may here be remarked that it is wholly out of the question to water stock in a common stock-car, for no man dare enter a car with a bucket of water where there are twenty or twenty-five cattle nearly dying with thirst and hunger; he would be trampled to death in an instant.

To meet this want I make use of the devices shown in Figs. 2 and 3. O, Fig. 2, is a hay-rack, pivoted to a base, *p*, which is provided with hooks *p' p'*, that engage with eyes *n n* in the sides of the car, and a rod, *s*, having a hook, *s'*, that enters an eye, *m*, serves to hold the rack in position. D', Fig. 3, is a trough, having hooks u u, rod t, and hook t', adapted for attachment in a similar manner.

Fodder may be supplied to the rack, and water from a brook or from the tender to the troughs D', and the slats B being raised the wants of the animals are ministered to.

The plant is simple and inexpensive, and—a most important point, the necessary alteration—the sliding slats B may be applied to the ordinary stock-cars at a very trifling outlay. It is only necessary to knock out one or more horizontal slats, bolt an iron rod against the inside of the car, at either end, to serve as guides, and apply a board as the sliding slat.

What I claim is—

1. A stock-car having horizontal lateral openings extending throughout the length of the car and covered by slats sliding in guides attached to the sides of the car, the said slats being provided with means for securing them in their raised and lowered positions, as set forth.

2. In combination with a stock-car having horizontal lateral openings, as described, a water-trough vertically and laterally adjustable with reference thereto, as and for the purpose set forth.

3. In combination with the car A, having sliding slats B and eyes n m, the trough D', adapted for attachment thereto, as described.

4. The posts I, connecting-rods i, with pulleys h sliding thereon, and trough D, the whole adapted for use in connection with the car, as described.

GEO. F. PATTERSON.

Witnesses:
R. D. WILLIAMS,
THOS. H. MARKS.